US012165196B2

(12) United States Patent
Lee et al.

(10) Patent No.: US 12,165,196 B2
(45) Date of Patent: Dec. 10, 2024

(54) METHOD AND SYSTEM FOR CLOTHING VIRTUAL TRY-ON SERVICE BASED ON DEEP LEARNING

(71) Applicant: NHN Corporation, Gyeonggi-do (KR)

(72) Inventors: Rokkyu Lee, Gyeonggi-do (KR);
Minseok Kang, Gyeonggi-do (KR);
Byumhyuk Koo, Gyeonggi-do (KR);
Hyugjae Lee, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 334 days.

(21) Appl. No.: 17/703,903

(22) Filed: Mar. 24, 2022

(65) Prior Publication Data
US 2022/0318892 A1    Oct. 6, 2022

(30) Foreign Application Priority Data
Mar. 26, 2021   (KR) .................. 10-2021-0039930

(51) Int. Cl.
*G06Q 30/0601*      (2023.01)
*G06T 3/18*         (2024.01)
(Continued)

(52) U.S. Cl.
CPC .......... *G06Q 30/0643* (2013.01); *G06T 3/18* (2024.01); *G06T 7/12* (2017.01); *G06T 7/38* (2017.01)

(58) Field of Classification Search
None
See application file for complete search history.

(56) References Cited

U.S. PATENT DOCUMENTS 7,663,648 B1 *  2/2010  Saldanha ............... G06T 17/00
                                              345/428
8,275,590 B2 *  9/2012  Szymczyk ............. G06Q 50/01
                                              345/646
(Continued)

FOREIGN PATENT DOCUMENTS

KR      10-2004-0093576      11/2004
KR      10-1586010           1/2016
(Continued)

OTHER PUBLICATIONS

Notice of Allowance dated Oct. 10, 2023 for Korean Patent Application No. 10-2021-0039930 and its English translation from Global Dossier.

(Continued)

*Primary Examiner* — Jason A Pringle-Parker
(74) *Attorney, Agent, or Firm* — Womble Bond Dickinson (US) LLP

(57) ABSTRACT

A method of a clothing virtual try-on service based on deep learning allowing a virtual try-on service application executed by at least one processor of a computing device to perform a process of the clothing virtual try-on service based on the deep-learning includes: determining a first clothes image including a first clothes object, a second clothes image including a second clothes object, and a model image including a model object; generating a first transformed clothes image by transforming a shape of the first clothes object to correspond to the model object; generating a second transformed clothes image by transforming a shape of the second clothes object to correspond to the model object; and generating and outputting a virtual fitting image obtained by synthesizing the first transformed clothes image and the second transformed clothes image to be virtually fitted on the model object.

13 Claims, 13 Drawing Sheets

(51) Int. Cl.
*G06T 7/12* (2017.01)
*G06T 7/38* (2017.01)

(56) References Cited

U.S. PATENT DOCUMENTS

| | | | | |
|---|---|---|---|---|
| 9,373,025 | B2* | 6/2016 | Amacker | G06V 40/10 |
| 9,898,742 | B2* | 2/2018 | Higgins | G06T 19/00 |
| 9,996,909 | B2* | 6/2018 | Masuko | H04N 9/3185 |
| 10,019,779 | B2* | 7/2018 | Lee | G06Q 30/0643 |
| 10,091,474 | B2* | 10/2018 | Masuko | H04N 9/3176 |
| 10,096,122 | B1* | 10/2018 | Agrawal | G06T 7/90 |
| 10,109,112 | B2* | 10/2018 | Glasgow | G06T 19/20 |
| 10,380,794 | B2* | 8/2019 | Hauswiesner | G06T 7/344 |
| 10,423,220 | B2* | 9/2019 | Osada | G06F 3/011 |
| 10,653,962 | B2* | 5/2020 | Gadre | G06T 19/00 |
| 2010/0030578 | A1* | 2/2010 | Siddique | H04W 4/00 |
| | | | | 705/26.1 |
| 2012/0287122 | A1* | 11/2012 | Nadar | G06T 17/00 |
| | | | | 345/632 |
| 2014/0035913 | A1* | 2/2014 | Higgins | G06Q 30/0641 |
| | | | | 345/420 |
| 2014/0176565 | A1* | 6/2014 | Adeyoola | G06T 19/006 |
| | | | | 345/473 |
| 2014/0368499 | A1* | 12/2014 | Kaur | G06T 19/20 |
| | | | | 345/420 |
| 2015/0026016 | A1* | 1/2015 | DeVeaux | G06T 11/60 |
| | | | | 705/27.2 |
| 2016/0063588 | A1* | 3/2016 | Gadre | G06Q 10/087 |
| | | | | 705/26.61 |
| 2016/0155186 | A1* | 6/2016 | Su | G06F 16/532 |
| | | | | 705/27.2 |
| 2017/0352092 | A1* | 12/2017 | Mitchell | G06T 15/503 |
| 2018/0047192 | A1* | 2/2018 | Kristal | G06T 11/60 |
| 2018/0308149 | A1* | 10/2018 | Guo | G06N 3/045 |
| 2018/0350151 | A1* | 12/2018 | Manvel | G06T 19/20 |
| 2019/0043269 | A1* | 2/2019 | Lin | G06T 7/62 |
| 2019/0244407 | A1* | 8/2019 | Wiesel | G06T 11/00 |
| 2020/0183969 | A1 | 6/2020 | Wiesel et al. | |

FOREIGN PATENT DOCUMENTS

| | | |
|---|---|---|
| KR | 10-2020-0049746 | 5/2020 |
| KR | 10-2021-0030747 | 3/2021 |

OTHER PUBLICATIONS

Office Action dated Nov. 17, 2022 for Korean Patent Application No. 10-2021-0039930 and its English Translation from Global Dossier.

Neuberger, Assaf et al.: "Image Based Virtual Try-on Network from Unpaired Data", 2020IEEE/CVF Conference on Computer Vision and Pattern Recognition (CVPR), Jun. 13-19, 2020, pp. 5184-5193.

* cited by examiner

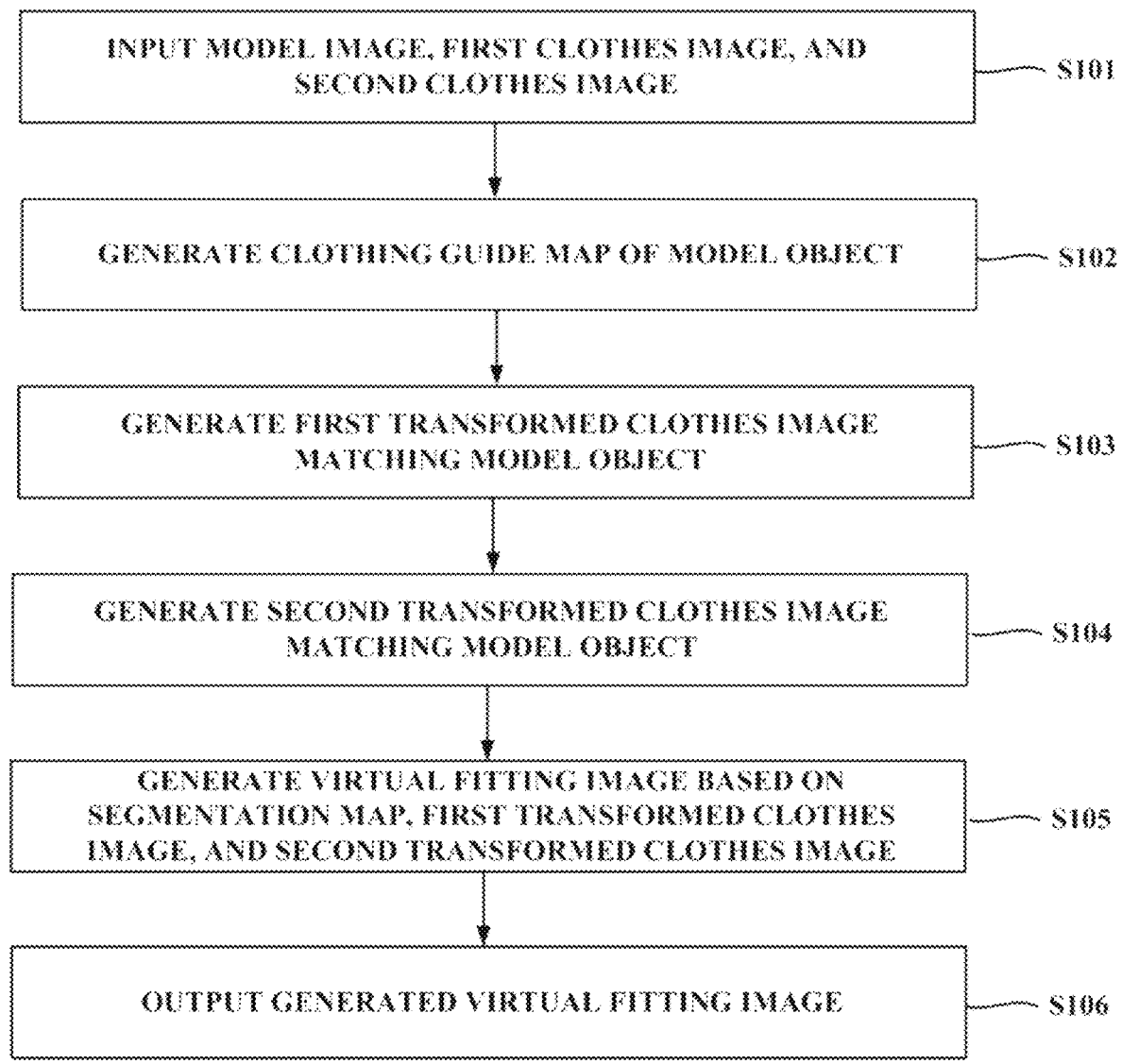

Disc. = Discriminator

METHOD AND SYSTEM FOR CLOTHING VIRTUAL TRY-ON SERVICE BASED ON DEEP LEARNING

CROSS REFERENCE TO RELATED APPLICATION(S)

This application claims the priority to Korean Patent Application No. 10-2021-0039930, filed on Mar. 26, 2021, which is all hereby incorporated by reference in its entirety.

BACKGROUND OF THE DISCLOSURE

Technical Field

The present disclosure generally relates to a method and system for a clothing virtual try-on service based on deep learning. More particularly, the present disclosure relates to a method and system for providing a virtual state of a model fitted with a plurality of clothes using a deep-learning neural network.

Related Art

In modern society, as the use of user terminals such as smartphones, tablet personal computers (PCs), personal digital assistants (PDAs), and notebook computers has become popular and information processing technology has been developed, research into image editing technology for capturing an image or transferring image using a user terminal and editing the captured image according to user needs is being actively conducted.

In particular, one of the fields in which such image editing is commercially used is the field of a clothing virtual try-on service, in which clothes displayed in an online shopping mall are virtually tried on.

In detail, upon shopping offline to buy clothes, trying on clothes is one of the essential procedures in determining whether the clothes fit purchasers.

However, upon shopping on an online shopping site, users can only look at images of clothes fitted on models to determine whether the clothes fit the users.

If technology that allows users to virtually try on clothes based on clothes images uploaded to online shopping malls is provided, it is possible to provide innovative new applications to the fashion industry and provide users with a more realistic experience.

Therefore, in recent years, interest in a system for a clothing virtual try-on service that provides a more realistic experience as described above is naturally increasing.

In addition, with the widespread use of image-to-image networks and productive adversarial networks (GANs), research on the system for a clothing virtual try-on service is also increasing. One of the most successful architectures developed recently is the CP-VTON.

However, the final virtual fitting image generated by the CP-VTON is blurred, distorted, and generated as a result with an artificial appearance, which reduces the purchasing power of clothing items.

In addition, the conventional system for a clothing virtual try-on service is focused on fitting on a single piece of clothing, and therefore, there is a problem that the conventional system does not satisfy users' needs to know whether a plurality of clothes fit the users well.

The conventional system does not present a technology for harmoniously virtually fitting the top garment and bottom garment, and merely suggests a concept that garments may be fitted at the idea stage.

RELATED ART DOCUMENT

Patent Document (Patent Document 1) Korean Patent Application Publication No. 10-2020-0049746 A
(Patent Document 2) Korean Patent No. 10-1586010 B1

SUMMARY

Various embodiments of the present disclosure provide a method and system for a clothing virtual try-on service based on deep learning that provides a virtual state of naturally fitting a plurality of clothes on a model object using a deep-learning neural network.

In addition, some embodiments of the present disclosure provide a method and system for a clothing virtual try-on service based on deep learning that provides a virtual image of a model naturally fitted with a plurality of clothes.

In an aspect, a method of clothing virtual try-on service based on deep learning allowing a virtual try-on service application executed by at least one processor of a computing device to perform a process of clothing virtual try-on service based on deep learning includes: determining a first clothes image including a first clothes object, a second clothes image including a second clothes object, and a model image including a model object; generating a first transformed clothes image by transforming a shape of the first clothes object to correspond to the model object; generating a second transformed clothes image by transforming a shape of the second clothes object to correspond to the model object; and generating and outputting a virtual fitting image obtained by synthesizing the first transformed clothes image and the second transformed clothes image to be virtually fitted on the model object.

In another aspect, a system for clothing virtual try-on service based on deep learning includes: a display configured to output a virtual fitting image; at least one processor; and at least one memory, in which at least one application stored in the memory and executed by the at least one processor to perform a process of clothing virtual try-on service based on deep learning determines a first clothes image including a first clothes object, a second clothes image including a second clothes object, and a model image including a model object, generates the first transformed clothes image by transforming a shape of the first clothes object to correspond to the model object, generates the second transformed clothes image by transforming a shape of the second clothes object to correspond to the model object, generates a virtual fitting image obtained by synthesizing the first transformed clothes image and the second transformed clothes image to be virtually fitted on the model object, and outputs the virtual fitting image by controlling the display.

According to an embodiment of the present disclosure, the method and system for a clothing virtual try-on service based on deep learning provide a shape of virtual fitting of a clothing image on a model object using a deep-learning neural network to enable users to virtually fit clothes they want and easily and rationally figure out whether the clothes fit the users well even during shopping online, thereby saving time or money spent shopping for clothes.

In addition, according to some embodiments of the present disclosure, the method and system for a clothing virtual try-on service based on deep learning may construct a deep-learning neural network that outputs high-performance virtual fitting results even with limited training data by virtually fitting a predetermined clothing image to a model in a model image with an outdoor background having various patterns and/or colors, etc. without distortion even when using a deep-learning neural network trained based on a training data set based on model images photographed in the background of an interior having a simple pattern and/or color, etc.

In addition, according to certain embodiments of the present disclosure, the method and system for a clothing virtual try-on service based on deep learning may perform accurate and lossless virtual fitting regardless of the characteristics of the background of the model on which the clothes image is to be fitted by virtually fitting a predetermined clothes image without distortion to the model in the model image with the outdoor background.

BRIEF DESCRIPTION OF THE DRAWINGS

FIG. 2B is a flowchart for showing a method of a virtual try-on service application to virtually fit a plurality of clothing on a model object according to an embodiment of the present disclosure.

DESCRIPTION OF EXEMPLARY EMBODIMENTS

Figure 1:
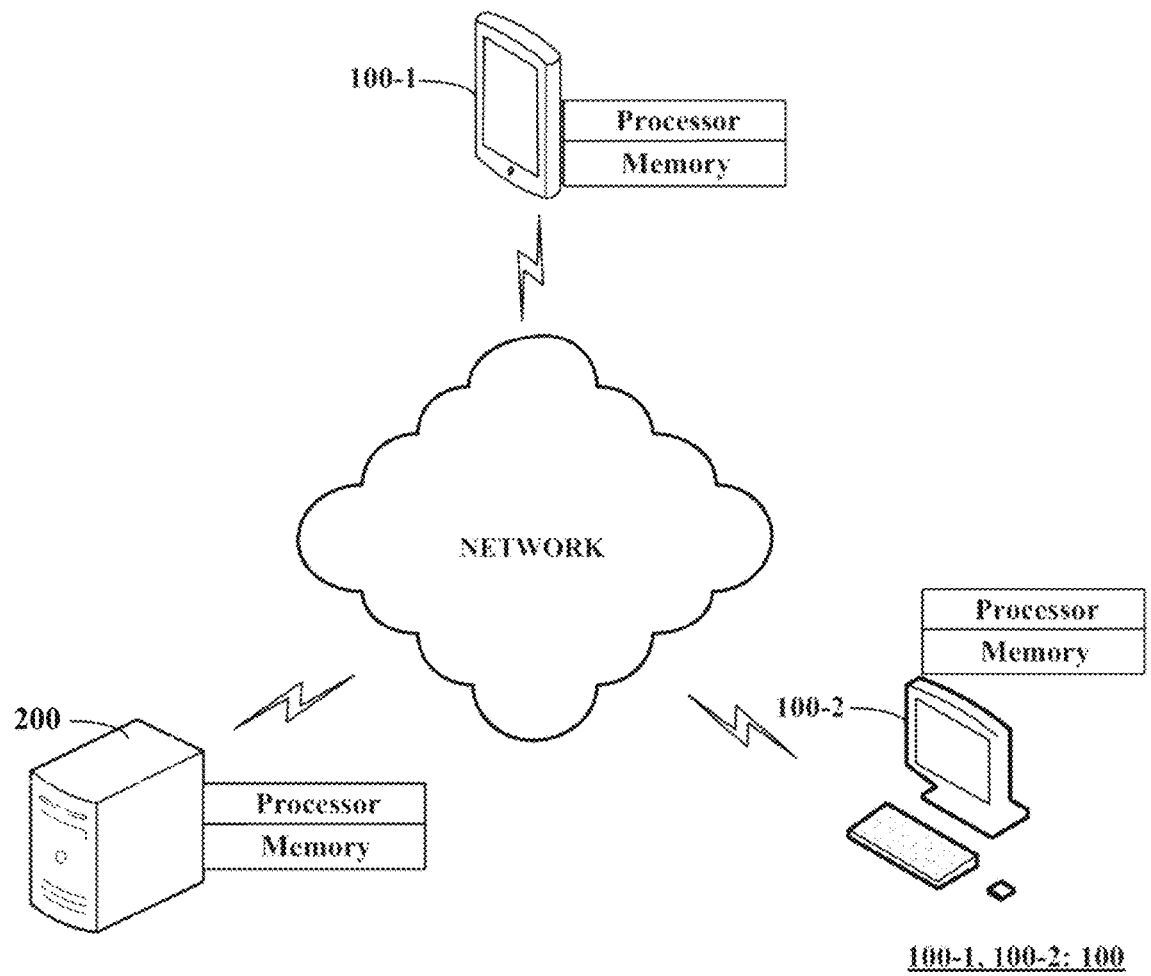
FIG. 1 is a conceptual diagram of a system for a clothing virtual try-on service based on deep learning according to an embodiment of the present disclosure.

Since the present disclosure may be variously modified and have several exemplary embodiments, specific exemplary embodiments will be illustrated in the accompanying drawings and be described in detail in a detailed description. Various effects and features of the present disclosure and methods accomplishing them will become apparent from the following description of embodiments with reference to the accompanying drawings. However, the present disclosure is not limited to the embodiments disclosed below, but may be implemented in various different forms. In the following embodiment, terms such as first, second, etc. are used for the purpose of distinguishing one component from another, not in a limiting sense. In this case, singular forms include plural forms unless interpreted otherwise in context. In addition, the terms "include" or "have" mean that features or elements described in the specification are present, and unless specifically limited, and do not preclude the possibility that one or higher other features or components may be added unless specifically limited. In addition, sizes of components may be exaggerated or reduced in the accompanying drawings for convenience of explanation. For example, since sizes and thicknesses of the respective components illustrated in the drawings are arbitrarily illustrated for convenience of explanation, the present disclosure is not necessarily limited to those illustrated in the drawings.

Hereinafter, embodiments of the present disclosure will be described in detail with reference to the accompanying drawings. Like reference numerals designate like elements throughout the specification, and overlapping descriptions of the elements will not be provided.

FIG. 1 is a conceptual diagram of a system for a clothing virtual try-on service based on deep learning according to an embodiment of the present disclosure.

Referring to FIG. 1, a system for a clothing virtual try-on service based on deep learning (hereinafter, "the system for the clothing virtual try-on service") according to an embodiment of the present disclosure may provide a virtual try-on service that provides a state in which a plurality of clothes are virtually fitted on a model object using a deep-learning neural network.

In an exemplary embodiment, such a system for a clothing virtual try-on service may include one or more computing devices 100 (100-1, 100-2) and a server 200 for a virtual wear service (hereinafter "virtual wear service providing server".

In this case, the computing device 100 and the virtual wear service providing server 200 may be connected based on a network.

Here, the network may refer to a connection structure capable of exchanging information between a respective node such as the computing device 100 and/or the virtual try-on service providing server 200. Examples of such a network include a 3rd generation partnership project (3GPP) network, a long term evolution (LTE) Network, a world interoperability for microwave access (WIMAX) network, Internet, a local area network (LAN), a wireless local area network (wireless LAN), a wide area network (WAN), a personal area network (PAN), a Bluetooth network, a satellite broadcasting network, an analog broadcasting network, a digital multimedia broadcasting (DMB) network, and the like, but are not limited thereto.

Computing Device 100

The computing device 100 according to an embodiment of the present disclosure may be a computing device in which a virtual try-on service application 101 providing a virtual try-on service is installed.

In an embodiment, the virtual try-on service application 101 may be a special purpose program configured to perform a function of virtually fitting one or more various clothes on a model, and may be a web browser program for accessing a web site that provides a virtual try-on service of the virtual try-on service providing server 200.

From a hardware point of view, the computing device 100 may include a mobile type computing device 100-1 and/or a desktop type computing device 100-2 in which the virtual try-on service application 101 is installed.

Here, the mobile type computing device 100-1 may be a mobile device such as a smart phone or a tablet personal computer (PC) in which the virtual try-on service application 101 is installed.

For example, the mobile type computing device 100-1 may include a smart phone, a mobile phone, a digital broadcasting terminal, personal digital assistants (PDA), a portable multimedia player (PMP), a tablet PC, and the like.

In addition, the desktop type computing device 100-2 may include an apparatus or the like, in which a program for executing a virtual try-on service based on wired/wireless communication is installed, such as a personal computer such as a fixed desktop PC, a laptop computer, and an ultrabook in which the virtual try-on service application 101 is installed.

Meanwhile, from a functional point of view, the computing device 100 may include at least one communication module for communicating or exchanging data with an external device (e.g., virtual try-on service providing server 200, etc.), at least one memory 102 for storing various application programs, data, and/or instructions for providing a virtual try-on service, and at least one processor 103 for data processing.

Here, the memory 102 may store any one or more of an operating system (OS) for providing a virtual try-on service, various application programs, data, and commands.

Also, the memory 102 may include a program area and a data area.

Here, the program area according to the embodiment may be linked between an operating system (OS) for booting or operating the computing device 100 and functional elements, and the data area store data generated according to the processing or use of the computing device 100.

In an exemplary embodiment, the memory 102 may store a virtual try-on service application, and the processor 103 may read the stored virtual try-on service application and perform a process of virtually fitting a plurality of clothes on the model.

In an embodiment, the memory 102 may include one or more various storage devices such as ROM, RAM, EPROM, flash drive, and hard drive, and may be a web storage that performs a storage function of the memory 102 on the Internet. In addition, the memory 102 may be a recording medium in a form detachable on the computing device 100.

Meanwhile, the processor 103 may control the overall operation of each unit described above in order to implement a virtual try-on service.

The processor 103 may be a system-on-chip (SOC) suitable for the computing device 100 including at least one central processing unit (CPU) and/or graphic processing unit (GPU), and may execute an operating system (OS) and/or an application program stored in the memory and may control each component mounted in the computing device 100.

In addition, the processor 103 may internally communicate with each component by a system bus, and may include one or more predetermined bus structures including a local bus.

In addition, the processor 103 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

Figure 2A:
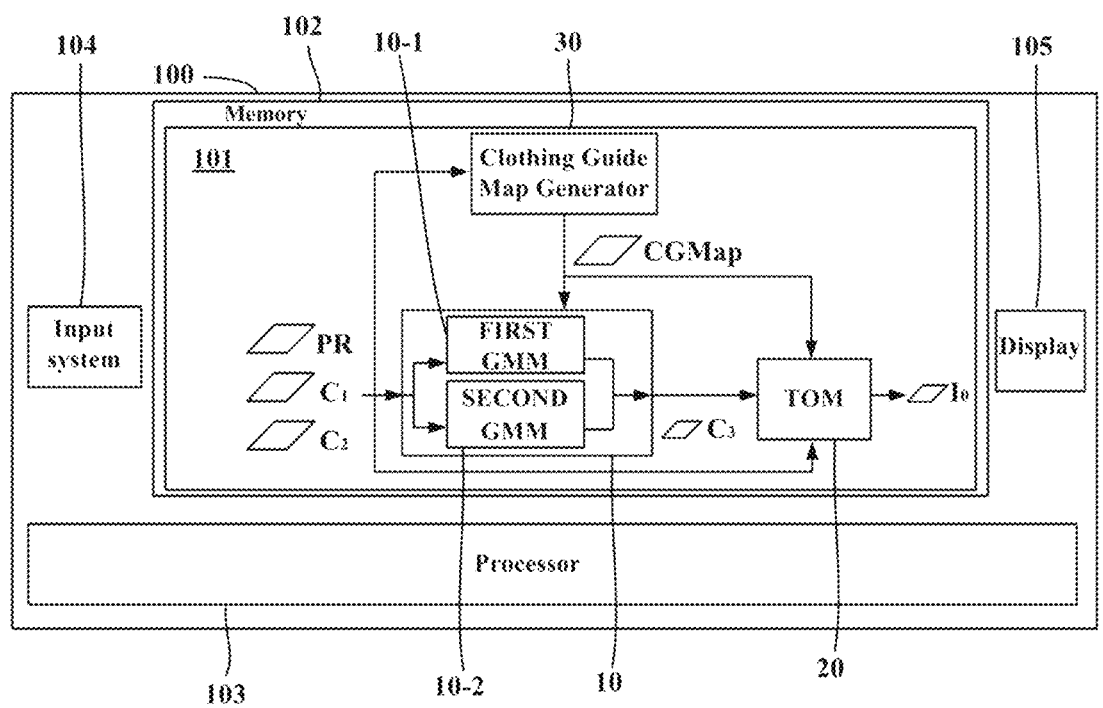
FIG. 2A is an internal block diagram of a computing device installed with a virtual try-on service application according to an embodiment of the present disclosure.
Figure 3:
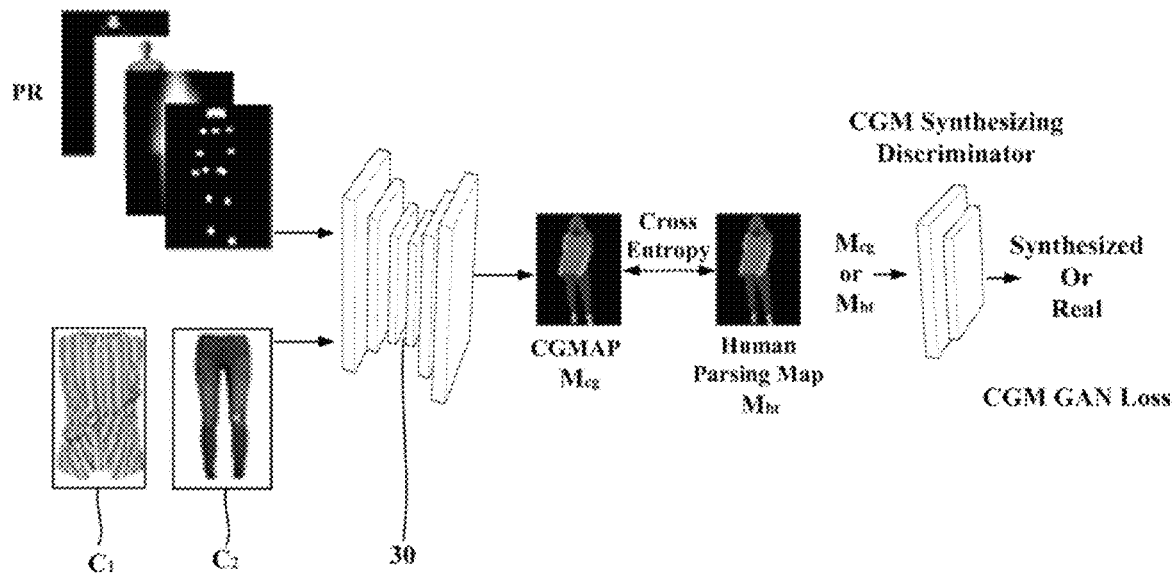
FIG. 3 is a diagram for illustrating a process of generating a clothing guide map of a model object according to an embodiment of the present disclosure.

FIG. 2A is an internal block diagram of a computing device installed with a virtual try-on application according to an embodiment of the present disclosure.

Referring to FIG. 2A, the virtual try-on service application 101 installed in the computing device 100 as described above in the embodiment may be implemented to include at least one module based on deep learning.

The virtual try-on service application 101 according to the embodiment may provide a virtual try-on service for virtually fitting a plurality of clothes on a model object.

For example, when a first clothes image representing first clothes, a second clothes image representing second clothes, and a model image representing a model object are input to the virtual try-on service application 101, the virtual try-on service application 101 can provide a virtual fitting image representing a model object fitting the first clothes and the second clothes.

When a user inputs the first clothes image, the second clothes image, and the model image selected into the virtual try-on service application 101 through the input system 104, the virtual try-on service application 101 may generate a virtual fitting image representing a model for fitting of the first clothes and the second clothes, and may output the generated virtual fitting image through the display 105.

When the computing device 100 is a mobile type computing device, the input system 104 and the display 105 may be a touch screen that provides a touch-based input/output interface.

Hereinafter, for illustration purposes only, the first clothes will be described as a top garment and the second clothes will be described as a bottom garment, but the clothes may also be applied to various types of clothes such as hats, socks, outerwear, underwear, scarves, gloves, bags, and accessories.

The virtual try-on service application 101 according to the embodiment may include a geometric matching module 10, a virtual fitting module 20, and a clothing guide map generator 30.

Firstly, the clothing guide map generator 30 is a module configured to generate a clothing guide map for a model object of a model image PR.

In detail, upon inputting a top garment image $C_1$, a bottom garment image $C_2$, and a model image PR, including at least one deep-learning model, the clothing guide map generator 30 may generate a clothing guide map (CGMap) in which the model object is segmented into a plurality of areas.

In an embodiment, the clothing guide map (CGMap) may be a semantic map of a model object obtained by segmenting an area of clothes to be fitted and an area for each body part of the model object.

Such a clothing guide map (CGMap) may be an essential element for naturally and virtually fitting a plurality of clothes at the same time.

In addition, the geometric matching module 10 may generate a transformed clothes image by performing geometric transformation to match clothes of an input clothes image including at least one deep-learning model to a model object. In an embodiment, the top garment image $C_1$, the bottom garment image $C_2$, the model image PR, and the clothing guide map (CGMap) are inputted to the geometric matching module 10 and, the geometric matching module 10 may include a first geometric matching module 10-1 that transforms a top garment to match the model object and outputs a warped top garment image and a second geometric matching module 10-2 that transforms a bottom garment to match the model object and outputs a warped bottom garment image.

The geometric matching module 10 may be implemented as a plurality of geometric matching modules each trained for each different type of clothing, and thus, one or more geometric matching modules 10 selected according to the type of clothes of the input clothes image may transform clothes.

In addition, the virtual fitting module 20 may virtually fit a plurality of clothes on the model object.

Virtual Try-On Service Providing Server 200

In the embodiment of the present disclosure, the virtual try-on service providing server 200 may perform a series of processes or instructions for providing a virtual try-on service through the virtual try-on service application of the user's computing device 100.

In detail, in the embodiment, the virtual try-on service providing server 200 exchanges data necessary for the virtual fitting process to executed by or be driven in an external device such as the computing device 100 with the external device, thereby providing the virtual try-on service.

In more detail, the virtual try-on service providing server 200 may provide the environment in which the virtual try-on service may be operated in an external device (in the embodiment, a mobile type computing device 100-1 and/or a desktop type computing device 100-2, etc.).

To this end, the virtual try-on service providing server 200 may include data and/or commands, etc. for a virtual fitting program that is an application program for implementing the virtual try-on service.

In addition, in an embodiment, the virtual try-on service providing server 200 may provide an algorithm for implementing a deep-learning neural network used in the virtual try-on service.

Here, the deep-learning model may include a deep-learning neural network such as a convolutional neural network (CNN) (for example, U-net convolution neural network), and the embodiments of the present disclosure do not limit the deep-learning neural network topology itself.

In this case, in an embodiment, the deep-learning model may be trained based on a predetermined training data set.

In addition, in an embodiment, the virtual try-on service providing server 200 may train the deep-learning model used in the virtual try-on service as the training data set.

In this case, the training data set may be generated for each deep-learning model for training, and may include, for example, an input image set, an output image set, a triplet image set, a semantic map set matching the input image, and the like.

In addition, the virtual try-on service providing server 200 according to the embodiment may perform at least a part of the process performed in the virtual try-on service application 101.

That is, according to the embodiment, at least a part of the process of generating the clothing guide map (CGMap) performed by the virtual try-on service application 10, the geometric matching that transforms clothes to match the model, and generating a model virtual fitting image of warped clothes may be performed in the virtual try-on service providing server 200, and the remaining processes may be performed in the computing device 100.

In an embodiment, it will be described that the virtual try-on service providing server 200 provides a pre-trained deep-learning model to the computing device 100, and drives the virtual try-on service application through the deep-learning model provided by the computing device 100 to perform the virtual fitting process.

The virtual try-on service providing server 200 described above may be implemented by at least one communication processor for exchanging data with an external device, at least one memory that stores various application programs, data, and/or commands for providing the virtual try-on service, and a computing device including at least one processor for data processing.

Method of Clothing Virtual Try-on Service Based on Deep-Learning

Hereinafter, a method in which the virtual try-on service application 101 executed by at least one processor of the computing device 100 provides a virtual fitting service of a plurality of clothes based on the deep learning will be described in detail with reference to FIGS. 2 to 15.

In an embodiment of the present disclosure, at least one processor 103 of the computing device 100 may execute at least one virtual try-on service application 101 stored in at least one memory 102 or operate in a background state to provide the virtual try-on service.

FIG. 2B is a flowchart for describing a method of virtual try-on service application to virtually fit the plurality of clothes on a model object according to an embodiment of the present disclosure.

Referring to FIG. 2B, in an embodiment, the virtual try-on service application 101 executed in at least one processor 103 of the computing device 100 may input a plurality of clothes and model objects (S101).

For example, after executing the virtual try-on service application 101, the user may selectively input a top garment image C1, a bottom garment image C2, and a model image PR through the input system 104, and determine the model object of the top garment, bottom garment, and fitting target.

1. Clothing Guide Map (CGMap) Generator 30

The virtual try-on service application 101 that receives the top garment image C1, the bottom garment image C2, and the model image PR may generate a clothing guide map (CGMap) through the clothing guide map (CGMap) generator 30.

Here, the clothing guide map (CGMap) generator 30 may be a module configured to generate the clothing guide map (CGMap) in which the model object of the model image PR is segmented into a plurality of areas for each label.

In further detail, upon inputting the top garment image $C_1$, the bottom garment image $C_2$, and the model image PR, as well as at least one deep learning model, the clothing guide map generator 30 may generate the clothing guide map (CGMap) in which the model object is segmented into the plurality of areas.

In an embodiment, the clothing guide map (CGMap) is a semantic map of a model object in which a fitting area corresponding to clothes to be fitted on the model object, and at least one body area for each body part of the model object are segmented.

For example, the clothing guide map (CGMap) may be displayed in a different color for each area segmented in the model object, and may include label information about meanings represented by each area.

For example, the fitting area of the clothing guide map (CGMap) may include a top garment area in which the input top garment is to be fitted and a bottom garment area in which the input bottom garment is to be fitted.

The top garment area may represent a fitting shape when the input top garment is fitted on the model object. Therefore, the top garment area may mean a fitting area when the outer shape of the top garment is transformed to correspond to an area (e.g., upper body) fitted by the model object.

Also, the bottom garment area may represent a fitting shape when the input bottom garment is fitted on the model object. Therefore, the bottom garment area may mean a fitting area when the shape of the input bottom garment is transformed to correspond to the area (e.g., lower body) fitted on the model object.

In addition, the body area of the clothing guide map (CGMap) may be information on coordinates of pixels in the area representing the main body part of the model object of the model image PR.

For example, the body area of the clothing guide map (CGMap) is largely segmented into a head area map and a key point pose map. The head area map may include an eye area, a nose area, an ear area, a hair area, and/or a neck area. The key point pose map may include a shoulder area, an elbow area, a wrist area, a hip area, a knee area, and/or an ankle area, and the like.

In addition, the clothing guide map (CGMap) may further include a dense pose map obtained by localizing a set of coordinates representing a joint for each joint.

In addition, the clothing guide map (CGMap) may determine and represent an overlapping area between the fitting area and the body area as one of the two areas.

That is, when the fitting area and the body area overlap, the clothing guide map (CGMap) generator 30 may determine the label of the overlapping area according to priority.

For example, the clothing guide map (CGMap) generator 30 may determine the overlapping area as the top garment area when the top garment area and the upper body pose area overlap, and determine the overlapping area as the hair area when the top garment area and the hair area overlap.

This clothing guide map (CGMap) may be utilized as a processing guide of the geometric matching module 10 or/and the virtual fitting module 20, and thus, may be utilized as base data for a plurality of clothes to be virtually fitted on the model object naturally.

Clothing Guide Map (CGMap) Deep-Learning Model Learning Method

The clothing guide map (CGMap) generator 30 includes at least one top garment deep learning model, and may be trained in a virtual try-on service providing server 200 and provided to a virtual try-on service application 101.

The virtual try-on service providing server 200 may train the deep-learning model using, as the training data set, triplet data that matches the input image (top garment image $C_1$, bottom garment image $C_2$, model image PR) and the clothing guide map (CGMap) segmenting a plurality of fitting areas and body areas for the model object. Examples of the triplet data are illustrated in (a) to (d) shown in FIG. 4C.

Since it may not be easy to obtain or generate such triplet data, to overcome the insufficient number of training data sets, in an embodiment, the virtual try-on service providing server 200 may generate a pseudo-training data set through two strategies to perform self-directed learning on the deep-learning model of the clothing guide map (CGMap) generator 30.

Figure 4A:
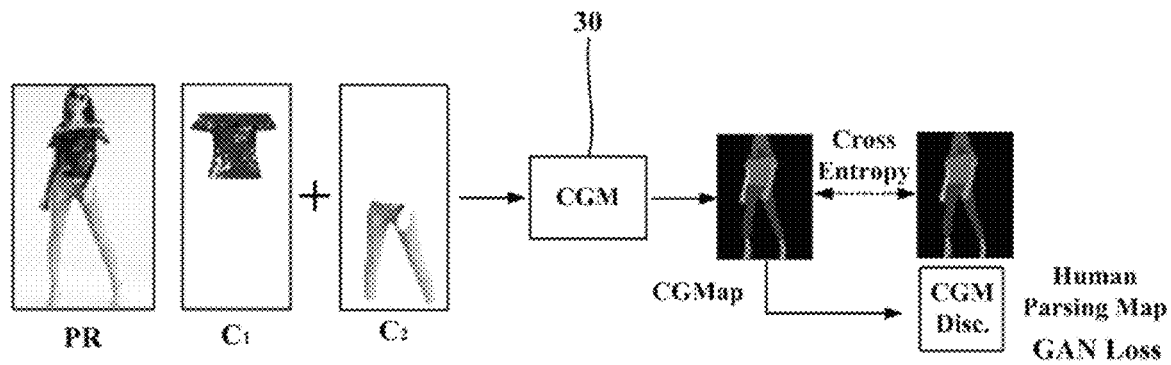
FIG. 4A is a diagram for illustrating a first training strategy for a clothing guide map generator according to an embodiment of the present disclosure.
Figure 4B:
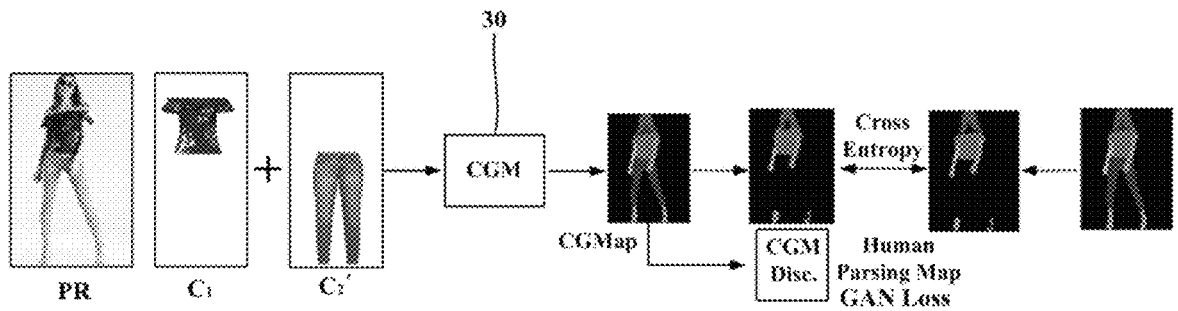
FIG. 4B is a diagram for illustrating a second training strategy for a clothing guide map generator according to the embodiment of the present disclosure.
Figure 4C:
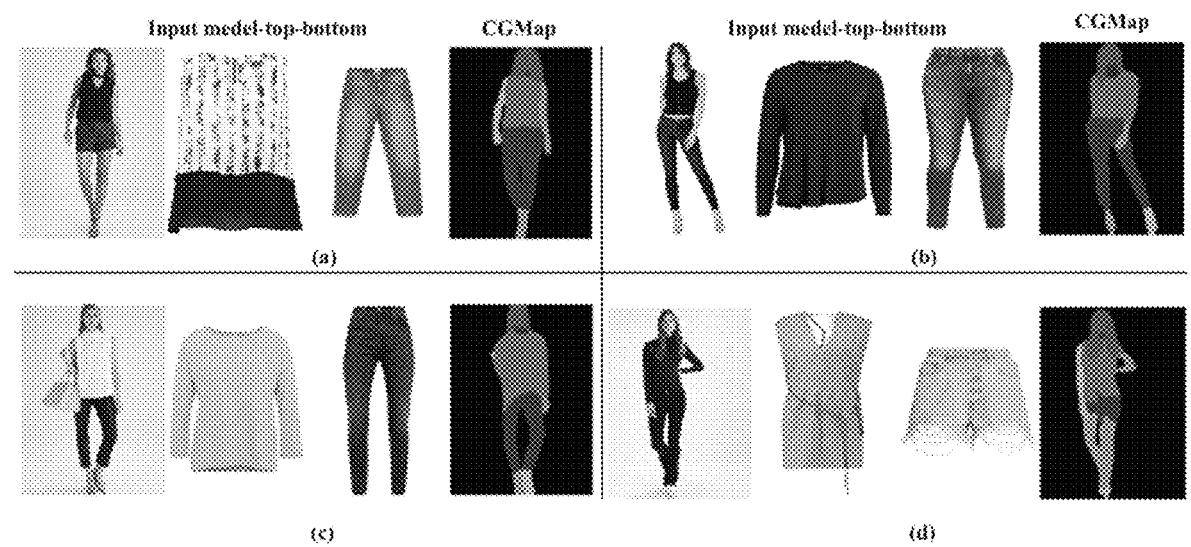
FIG. 4C is a diagram for illustrating samples generated through a trained clothing guide map generator according to an embodiment of the present disclosure.

FIG. 4A illustrates a first training strategy for the clothing guide map (CGMap) generator 30 according to an embodiment of the present disclosure, and FIG. 4B illustrates a second training strategy for the clothing guide map (CGMap) generator 30 according to an embodiment of the present disclosure.

The virtual try-on service server 200 may acquire a top garment image $C_1$ for a top garment product, a model image PR, and a whole body parsing map for the model image PR on a top garment-related sales page in the shopping mall.

Here, the whole body parsing map may be generated by inputting the model image PR to the pre-trained human parsing map deep-learning model.

Referring to FIG. 4A, the virtual try-on service providing server 200 as the training strategy may extract the bottom garment fitted on the model from the model image PR, and randomly affine transform the extracted bottom garment image to generate pseudo-triplet data that includes affine-transformed bottom garment image, model image PR, and the top garment image $C_1$, and the clothing guide map (CGMap) discriminator may train the deep-learning model based on a full body parsing map and pseudo-triplet data.

In this case, when a bottom garment image for a bottom garment product is acquired from the bottom garment-related sales page, the process as described above may be performed on the top garment in reverse to acquire the pseudo-triplet data, thereby training the deep-learning model.

Equation 1 below is a method in which the clothing guide map (CGMap) discriminator module (CGMap discriminator) trains the deep-learning model through the pseudo-triplet data through the training strategy.

$$L_{CGM}=L_{c1}+L_{c2}=(L_{cc1}+L_{cg1})+(L_{cc2}+L_{cg2}) \quad \text{(Equation 1)}$$

Here, Lc1 is a first loss function of the training strategy, Lc2 is a second loss function of the training strategy, Lcc1 is a cross-entropy loss for the whole body analysis map, and Lcc2 is a partial cross entropy loss comparing the model and the paired input garment-related label.

For example, the compared label are arms, an upper body, and top garment area labels for top garment, lower body and pants area labels for bottom garment, and both face and head labels are common. Lcg1 and Lcg2 are GAN losses for prediction.

The clothing guide map (CGMap) generator 30 including the deep-learning model trained in this way may be included in the virtual try-on service application 101, and when the triplet data is input, the clothing guide map (CGMap) generator 30 may generate the clothing guide map (CGMap) for the model object.

2. Method of Transforming Model Object Matching Clothing

Figure 5A:
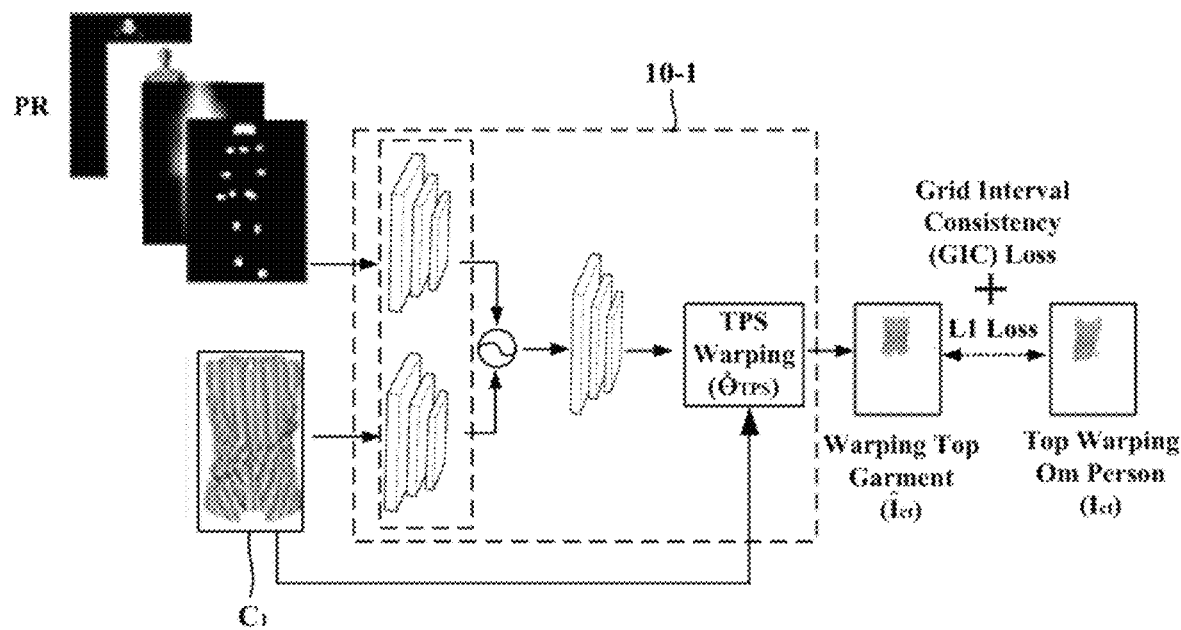
FIG. 5A is a diagram for illustrating a process of matching a plurality of clothes to model objects, respectively, according to an embodiment of the present disclosure.
Figure 5A:
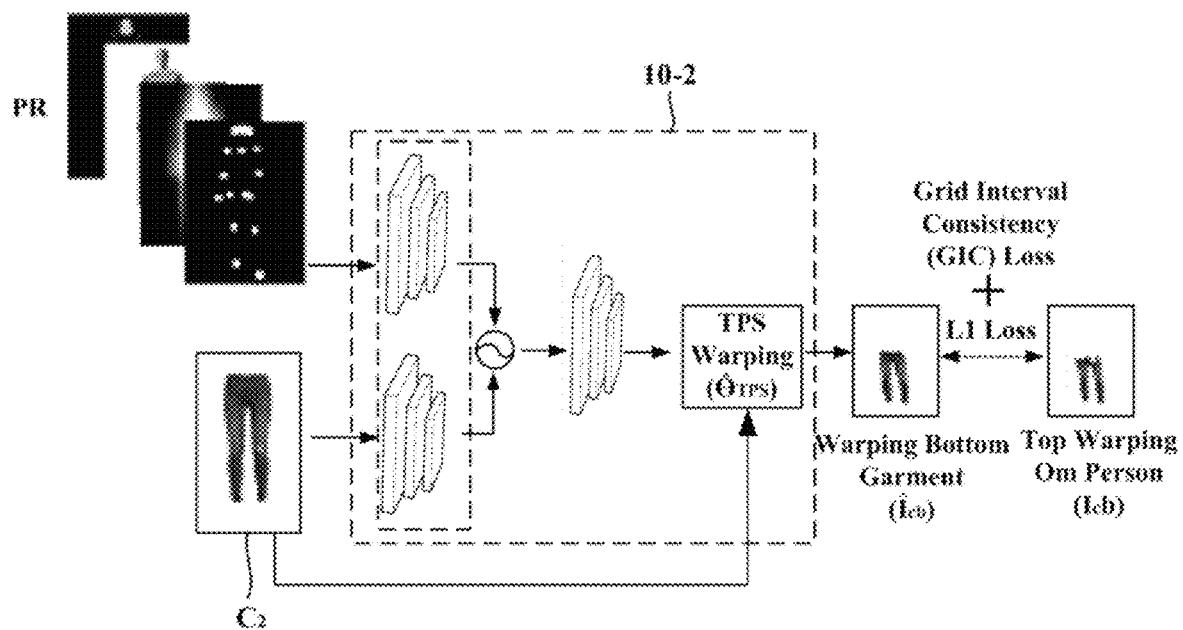
Figure 5B:
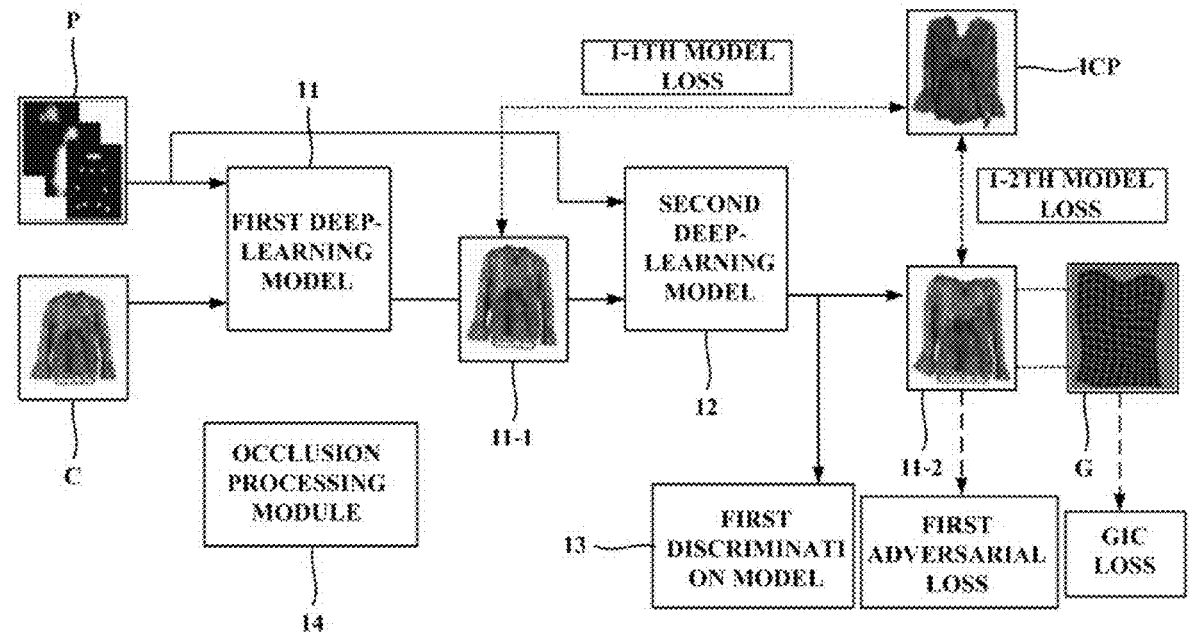
FIG. 5B is a diagram for illustrating a detailed structure of a geometric matching module for matching clothes to a model object according to an embodiment of the present disclosure.
Figure 6:
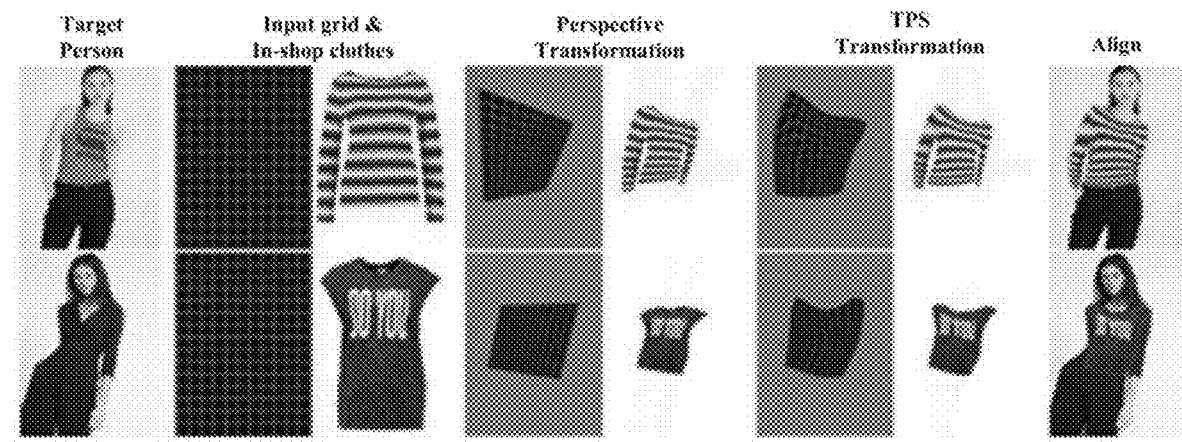
FIG. 6 is an experimental example illustrating perspective and detailed transformation of clothes by a geometric matching module according to an embodiment of the present disclosure.
Figure 7:
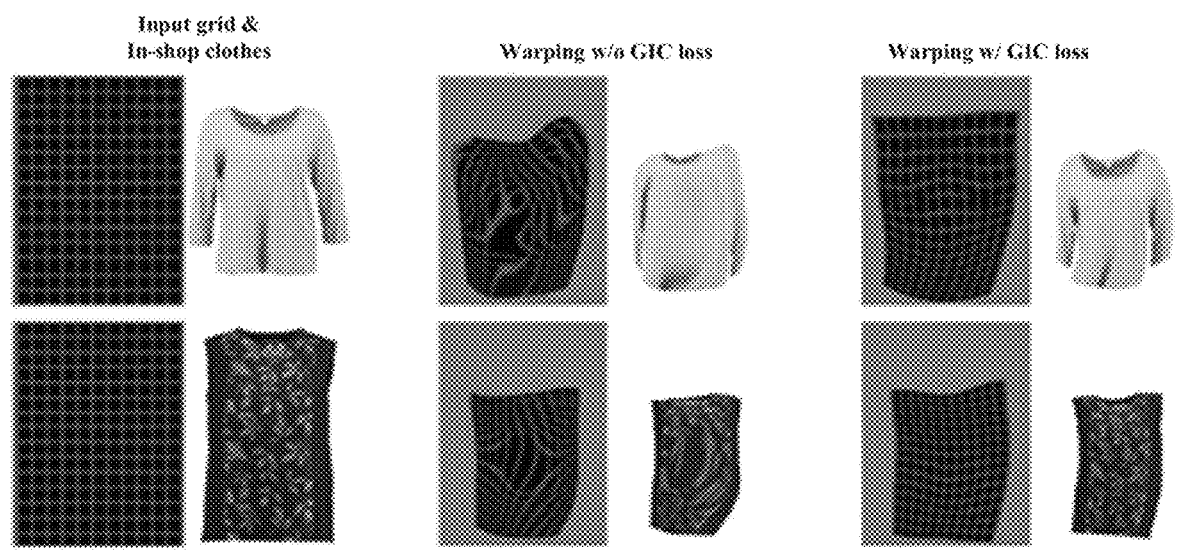
FIG. 7 is an experimental example illustrating the shape of transformation result when a geometric matching module according to an embodiment of the present disclosure does not apply a grid interval consistency loss and the shape of the transformation result when the geometric matching module applies a grid interval consistency loss.
Figure 8:
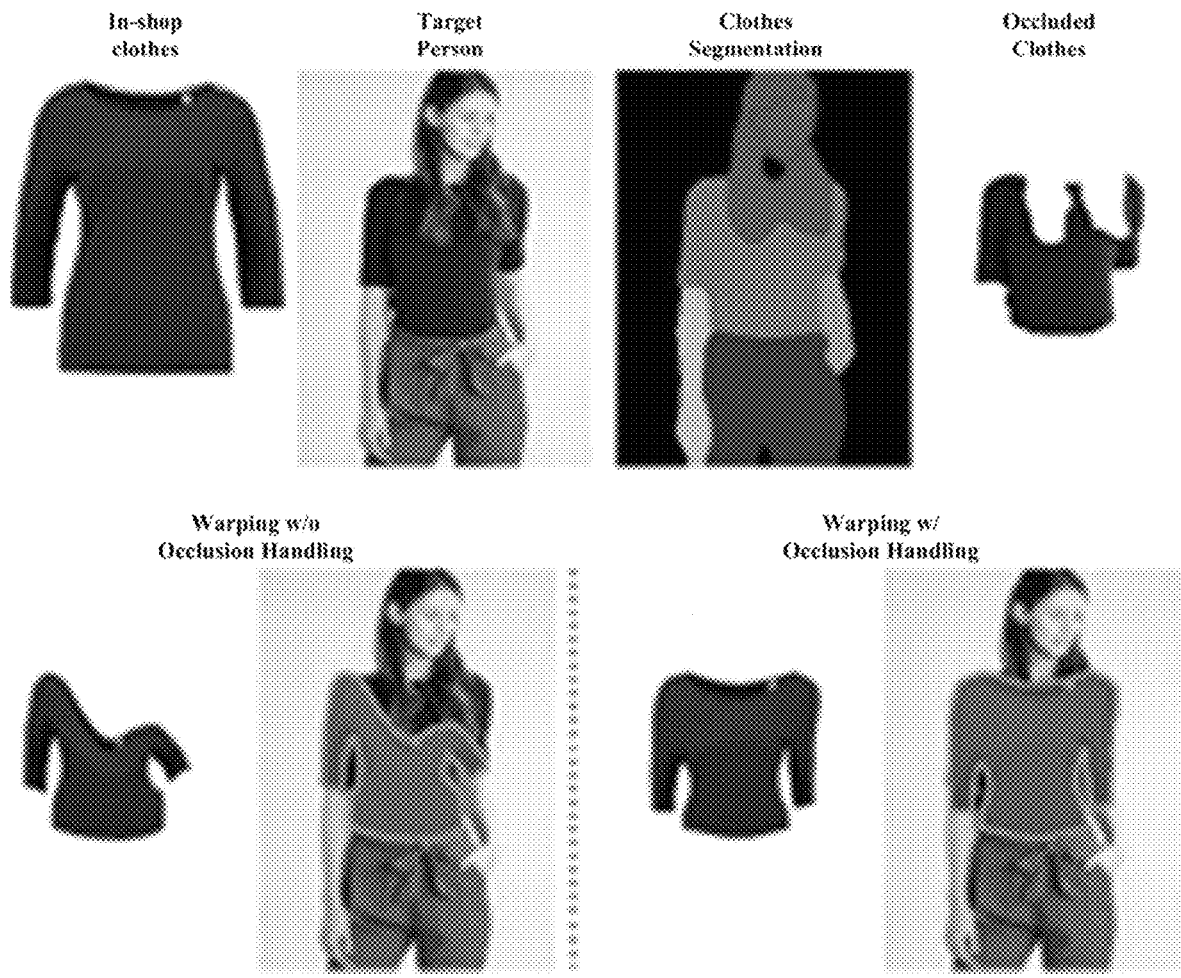
FIG. 8 is an experimental example illustrating the shape of transformation result when a geometric matching module does not apply occlusion processing and the shape of the transformation result when the geometric matching module applies the occlusion processing.
Figure 9:
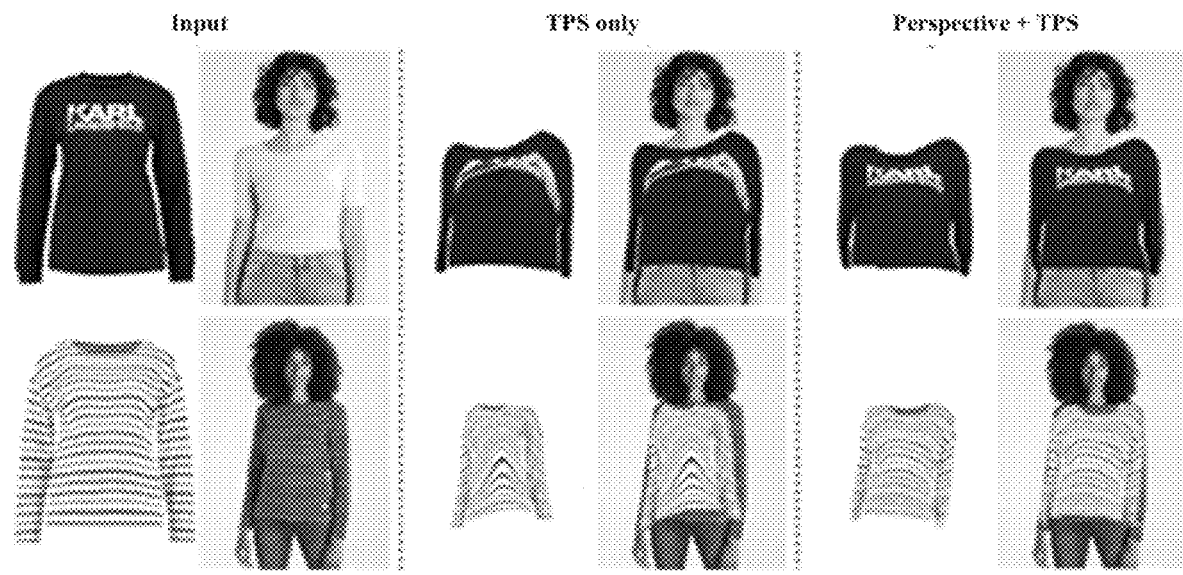
FIG. 9 is an experimental example illustrating the effect of sequentially transforming clothes of a 1-1th deep-learning model and a 1-2th deep-learning model of a geometric matching module according to the embodiment of the present disclosure.
Figure 10:
FIG. 10 is an experimental example illustrating an effect of applying grid interval consistency loss in a geometric matching module according to an embodiment of the present disclosure.
Figure 11:
FIG. 11 is an experimental example showing an effect of occlusion processing in a geometric matching module according to an embodiment of the present disclosure.
Figure 12:
FIG. 12 is an experimental example illustrating an effect of a first discriminator of a geometric matching module according to a embodiment of the present disclosure.

FIG. 5A illustrates a process of matching a plurality of clothes to a model object, respectively, according to an embodiment of the present disclosure, and FIG. 5B illustrates a detailed structure of a geometric matching module 10 that matches clothes to a model object according to an embodiment of the present disclosure. FIG. 6 illustrates an experimental example illustrating a perspective and detailed transformation of clothes by the geometric matching module 10 according to the embodiment of the present disclosure, and FIG. 7 illustrates an experimental example illustrating the shape of the transformation result when the geometric matching module 10 according to the embodiment of the present disclosure does not apply a grid interval consistency loss and the shape of the transformation result when the geometric matching module 10 applies the grid interval consistency loss. FIG. 8 is an experimental example showing the shape of the transformation result when the geometric matching module 10 according to the embodiment of the present disclosure does not apply the occlusion processing and the shape of the transformation result when the occlusion processing is applied, and FIG. 9 illustrates an experimental example showing the effect of sequentially transforming clothes of a 1-1th deep-learning model and a 1-2th deep-learning model of the geometric matching module 10 according to an embodiment of the disclosure. FIG. 10 is an experimental example illustrating an effect of applying the grid spacing coherence loss in the geometric matching module 10 according to the embodiment of the present disclosure, FIG. 11 is an experimental example illustrating an effect of occlusion processing in the geometric matching module 10 according to the embodiment of the present disclosure, and FIG. 12 is an experimental example illustrating an effect of a first discriminator of the geometric matching module according to the embodiment of the present disclosure.

Referring to FIGS. 5 to 12, the geometric matching module 10 according to an embodiment of the present disclosure may include a first deep-learning model 11, a second deep-learning model 12, and a first discriminator 13, and an occlusion processing module 14.

This geometric matching module 10 may determine at least one top garment area of the model object of the model image P matched according to the type of clothes, and geometrically transform the clothes object of the clothes image C according to the shape of the determined area to generate the image for the transformed clothes object.

For example, the geometric matching module 10 may transform the top garment in the top garment image to geometrically match the upper body area of the model object of the model image PR (S103), and may transform the bottom garment to geometrically match the lower body area of the model object in the bottom garment image (S104).

In another embodiment, the geometric matching module 10 may determine the type of clothes, determine at least one top garment segmentation area in the clothing guide map (CGMap) of the model object matching the type of clothes, and transform the shape of the clothes object to geometrically match the determined segmentation area.

For example, the geometric matching module 10 may determine the top garment area, a second area overlapping the top garment area, and a third area touching the top garment area in the clothing guide map (CGMap) of the model object, and transform the shape of the top garment according to the top garment area and the second to third areas.

Hereinafter, the process of geometrically transforming the top garment by the geometric matching module 10 based on the upper body will be described in detail.

Perspective Transformation of the First Deep-Learning Model 11

The first deep-learning model 11 perspectively transforms the clothes object (top garment) of the clothes image C according to the direction of the upper body area of the model object based on the model image P and the clothes image C to generate a transformed clothes object image $I_{1-1}$.

That is, the first deep-learning model 11 may twist and align the clothes object to match the direction of the body of the model object.

For example, referring to FIG. 6, there are a model image (target Person), a clothes object image (In-shop clothes), and an input grid of the clothes object image. The first deep-learning model 11 may perspectively transform the input grid of the clothes object image (in-shop clothes) and the clothes object image according to the direction to the model image (target person).

For example, the first deep-learning model 11 may be configured as a deep neural network and include a 1-1th feature extraction unit and a 1-1th transformation parameter estimation unit.

In this case, the 1-1th feature extraction unit may include four down-sampling convolutional layers having 2 strides and 4 kernel sizes and two convolution layers having 1 stride and 3 kernel sizes. The 1-1th transformation parameter estimation unit may include two down-sampling convolutional layers having 2 strides and 4 kernel sizes, two convolutional layers of 1 stride and 3 kernel sizes, and one fully connected layer. When a grid size Gsize is 5, the 1-1th transformation parameter estimation unit may estimate a total of nine parameters for perspective transformation.

Detailed Transformation of Second Deep-Learning Model 12

The second deep-learning model 12 may transform (thin-plate-spline) in detail the perspectively transformed clothes object of the 1-1th transformed clothes object image $I_{1-1}$ according to the detailed shape of the body of the model based on the 1-1th transformed clothes object image $I_{1-1}$ and the model object, thereby generating a 1-2th transformed cloths object image $I_{1-2}$.

That is, the second deep-learning model 12 may twist and align in detail the clothes object aligned and twisted according to the direction of the body of the model to match the detailed shape of the body area (or fitting area) of the model object PR.

As an example, referring to FIG. 6, the second deep-learning model 12 may perform, in detail, TPS transformation on the clothes object and the input grid that are prospectively transformed.

For example, the second deep-learning model 12 may be configured as a deep neural network and include a 1-2th feature extraction unit and a 1-2th transformation parameter estimation unit. The 1-2th feature extraction unit may include four down-sampling convolutional layers having 2 strides and 4 kernel sizes and two convolution layers having 1 stride and 3 kernel sizes. The 1-2th transformation parameter estimation unit may include two down-sampling convolutional layers having 2 strides and 4 kernel sizes, two convolutional layers having 1 stride and 3 kernel sizes, and one fully connected layer. When a grid size Gsize is 5, the 1-2th transformation parameter estimation unit may estimate a total of 50 parameters, which is 2*Gsize^2, for detailed transformation.

The 1-2th transformed clothes object may be transformed to have the upper body area of the model object and an outer line corresponding to the outer line corresponding to the upper body area.

In addition, the 1-2th transformed clothes object may be transformed according to a body area adjacent to or overlapped with the upper body area of the model object. For example, in the 1-2th transformed clothes object, the area overlapping the hair area overlapping the upper body area may be removed.

In addition, in the 1-2th transformed clothes object, an outer line of a part of the clothes object may be transformed so as to correspond to the outer line of the arm area adjacent to the upper body area.

That is, in the embodiment, the 1-2th transformed clothes object image corresponding to the top garment may be the first transformed clothes image C.

In addition, the 1-2th transformed clothes object image corresponding to the bottom garment may be the second transformed clothes image C.

Training of Geometric Matching Module 10

The virtual try-on service providing server 200 may separately train the first deep-learning model 11. The first deep-learning model 11 may use the 1-1th model loss $L_{persp}$ during training. The 1-1th model loss $L_{persp}$ is a loss that causes the perspective transformation of the clothes object to approximate the correct answer by comparing the 1-1th transformed virtual clothes image $I_{1-1}$ output by the first deep-learning model 11 with the transformed clothes correct answer image $I_{cp}$ of the training data set. The 1-1th model loss $L_{persp}$ is expressed by Equation 2.

$$L_{persp}=\|I_{1-1}-I_{cp}\|_1 \quad \text{(Equation 2)}$$

The virtual try-on service providing server 200 may use the 1-2th model loss $L_{warp}$ during training. In this case, compared to the 1-1th model loss $L_{persp}$, the 1-1th model loss $L_{persp}$ is a loss used for the training of the first deep-learning model 11, but the 1-2th model loss $L_{warp}$ is a reference loss used when training the entire neural network of the virtual try-on service providing server 200.

The 1-2th model loss $L_{warp}$ is a loss that causes the detailed transformation of the clothes object to match the detailed shape of the body of the model of the clothes object by comparing the 1-2th transformed virtual clothes image $I_{1-2}$ output by the second deep-learning model 12 with the transformed clothes correct answer image $I_{cp}$ of the training data set. The 1-2th model loss $L_{warp}$ is expressed by Equation 3.

$$L_{warp}=\|I_{1-2}-I_{cp}\|_1 \quad \text{(Equation 3)}$$

In addition, the virtual try-on service providing server may use grid interval consistency loss $L_{gic}$ during training. Clothes are objects that can be transformed into various shapes, but the transformation of the human body is limited. When a person wears clothes, characteristics of the clothes tend to be maintained in a person's torso. The detailed transformation (TPS transformation) by the second deep-learning model generally shows excellent performance, but due to its high flexibility, it often causes distortion of patterns and prints of clothes. The grid interval consistency loss $L_{gic}$ is used to prevent such distortion and maintain the characteristics of clothes. The grid interval consistency loss $L_{gic}$ is based on the distance DT (a, b) between neighboring a and b for each pixel of the clothes object image. Taking this into consideration, the grid interval consistency loss $L_{gic}$ is expressed by Equation 4.

$$L_{gic}(\hat{G}_x, \hat{G}_y) = \sum_{y}^{H_G} \sum_{x}^{H_G} \bigl(DT(\hat{G}_x(x, y), \hat{G}_x(x+1, y)) + DT(\hat{G}_y(x, y), \hat{G}_y(x, y+1))\bigr) \quad \text{(Equation 4)}$$

In Equation 4, $\hat{G}_x$ (x, y) is an x-coordinate of the grid to be mapped. $\hat{G}_x$ (x, y) is a y-coordinate of the grid to be mapped. $H_G$ is a height of the grid. $W_G$ $W_G$ is a width of the grid. The grid interval consistency loss $L_{gic}$ maintains the consistency of intervals in addition to the pattern and prints of clothes, so the shape characteristics can be maintained even after the clothes are transformed.

For example, referring to FIG. 7, there are a clothes object image (in-shop clothes) having a monochromatic or repetitive pattern printing characteristic and an input grid of the clothes object image. When the geometric matching module 10 is trained by considering only the 1-2th model loss $L_{warp}$, it can be seen that a vortex pattern is generated from the 1-2th transformed clothes object image and the grid (warping w/o GIC loss), and thus, the characteristics of the clothes are distorted.

It can be seen that the geometric matching module 10 is transformed to match the body of the model in which the characteristics of clothes are maintained in the 1-2th transformed clothes object image and the grid (warping w/o GIC loss) when using the second deep-learning model 12 trained by considering the grid interval consistency loss $L_{gic}$ for the 1-2th model loss $L_{warp}$.

In addition, the geometric matching module 10 may use the occlusion processing module 14 trained as described above to generate the transformed clothes object excluding the occluded area for the 1-2th model loss $L_{warp}$. The occluded area may refer to a part where the clothes object is covered by a person's hair, body, and the like.

In general, when a person wears clothes, the clothes may be covered by the body such as the arms or hair. In this case, since the neural network tries to match the clothes object to the clothes area that is not covered by the body, the transformation of the clothes object may occur during the virtual fitting.

To solve this, the occlusion processing module 14 may exclude the occluded area from the calculation of the 1-2th model loss $L_{warp}$.

For example, referring to FIG. 8, there are a clothes object image (in-shop clothes) and a model image (target person) for fitting of the clothes object. The occlusion processing module 14 may segment clothes (clothes segmentation) in the model image (target person) for fitting of the clothes object, that is, the transformed clothes correct image $I_{cp}$, and generate the occluded clothes image from which a part of the occluded clothes is removed.

The virtual try-on service providing server 200 may train the 1-2th model loss $L_{warp}$ using the occluded clothes image. Clothes that are transformed without occlusion processing are transformed (warping w/o occlusion handling) not to match a body of a virtual wearer. Clothes that are transformed without occlusion processing are transformed (warping w/o occlusion handling) not to match a body of a virtual wearer.

In addition, the virtual try-on service providing server 200 may use the first adversarial loss $L_{ggan}$ during training. That is, the virtual try-on service providing server may improve the geometric matching performance by using the GAN concept during training.

The limitation of the loss based on intensity difference like the 1-2th model loss $L_{warp}$ is that it may be difficult to distinguish the foreground and background of a similar colored top garment. As an example, it may be an image of white clothes on a white background.

To solve this, the geometric matching module 10 may use the first discriminator 13. The first discriminator 13 may be trained based on a GAN loss and a hinge loss. Also, the first discriminator 13 may generate a first discriminator image $D(I_{1-2})$ based on the 1-2 transformed virtual clothes image $I_{1-2}$. The first adversarial loss $L_{ggan}$ is calculated by Equation 5.

$$L_{ggan}(I_{1-2}) = \text{ReLU}(1.0 - D(I_{1-2})) \quad \text{(Equation 5)}$$

As an example, the first discriminator 13 may include four down-sampling convolutional layers of 2 strides and 3 kernel sizes, one convolutional layer of 1 stride and 3 kernel sizes, and one fully connected layer. In addition, spectral normalization may be applied to the layer of the first discriminator.

In addition, the geometric matching module 10 may be trained to transform the clothes object to match the body of the model while maintaining the characteristics of the clothes object using the first deep-learning model loss $L_{gmm}$ that linearly combines the above-described losses. The first deep-learning model loss $L_{gmm}$ is calculated by Equation 6.

$$L_{gmm} = \lambda_{warp} L_{warp} + \lambda_{gic} L_{gic} + \lambda_{ggan} L_{ggan} \quad \text{(Equation 6)}$$

In Equation 6, $\lambda_{warp}$, $\lambda_{gic}$ and $\lambda_{ggan}$ are hyperparameters. The model may adjust the relative importance of each loss by adjusting the hyperparameters. For example, $\lambda_{warp}$, $\lambda_{gic}$ and $\lambda_{ggan}$ may be set to 1, 1, and 0.1, respectively.

Effect of Trained Geometric Matching Module 10

When the geometric matching module 10 performs the detailed transformation after the perspective transformation, the performance can be better than that of the detailed transformation. For example, referring to FIG. 9, the geometric matching module 10 may use the model image PR and the clothes object image as inputs.

There is an appearance of a virtual fitting image (TPS only) with only detailed transformation by the second deep-learning model 12. After the perspective transformation by the first deep-learning model 11, there is an appearance of a virtual fitting image (perspective+TPS) with the detailed transformation by the second deep-learning model 12. It can be seen that the latter virtual fitting image maintains the characteristics of clothes and shows a more realistic fitting appearance.

In addition, the geometric matching module 10 may preserve the patterns, prints, and the like of clothes without distortion when the clothes object is transformed to match the body by the grid interval consistency loss.

For example, referring to FIG. 10, the geometric matching module 10 may use the model image PR and the clothes object image as inputs. It can be seen that the transformed clothes object image (w/o GIC loss) that does not consider the grid interval consistency loss distorts unique characteristics such as patterns of clothes, but the transformed clothes object image (w/GIC loss) that considers the grid interval consistency loss maintains the unique characteristics such as the patterns of clothes.

In addition, the geometric matching module 10 may more accurately fit the clothes object transformed by the occlusion processing by the occlusion processing module 14 on the body of the model. For example, referring to FIG. 11, the geometric matching module 10 may use the model image PR and the clothes object image as inputs. The clothes object image (w/o occlusion handling) that is trained and transformed without occlusion processing is transformed not to match the body of the model. The clothes object image (w/o occlusion handling) that is trained and trained without occlusion processing is transformed not to match the body of the model.

In addition, the geometric matching module 10 compensates for the limits of the intensity-based loss function, such as the 1-2th model loss $L_{warp}$ by the first discriminator. The first adversarial loss $L_{ggan}$ by the first discriminator improves the transformation performance because it gives a disadvantage to the erroneous transformation result by the first and second deep-learning models.

For example, referring to FIG. 12, the geometric matching module 10 may use the model image PR and the clothes image as inputs. The clothes object image (w/o discriminator) that is trained and transformed without the first discriminator is transformed not to match the body of the model. The clothes object image (w/o discriminator) that is trained and transformed together with the first discriminator is transformed to match the body of the model.

In an embodiment, the geometric matching module 10 may generate a first transformed clothes image (C) generated by transforming the top garment in the top garment image, and a second transformed clothes image C generated by transforming the bottom garment in the bottom garment image.

To this end, the geometric matching module 10 may include a first geometric matching module 10-1 for transforming the type of clothes of the first clothes image C, and a second geometric matching module 10-2 for transforming the type of clothes of the second clothes image C. That is, the geometric matching module 10 includes a plurality of geometric matching modules 10 that are trained differently according to each type of clothes (clothing), and may determine the geometric matching module 10 that is trained according to the type of clothes object of the input clothes image C and generate the transformed clothes image C through the determined geometric matching module 10.

For example, the first geometric matching module 10-1 may include a deep-learning model trained to transform the top garment, and the second geometric matching module 10-2 may include the deep-learning model trained to transform the bottom garment.

In addition, the geometric matching module 10 may generate the transformed clothes object by aligning the first transformed clothes image C and the second transformed clothes image C to match the model object.

For example, the geometric matching module 10 may align the first transformation clothes to match the top garment area of the clothing guide map (CGMap) of the model object, and generate the transformed clothes object by aligning the second transformed clothes to match the bottom garment area of the clothing guide map (CGMap) of the model object.

3. Method of Virtually Fitting Transformed Clothes

Figure 13:
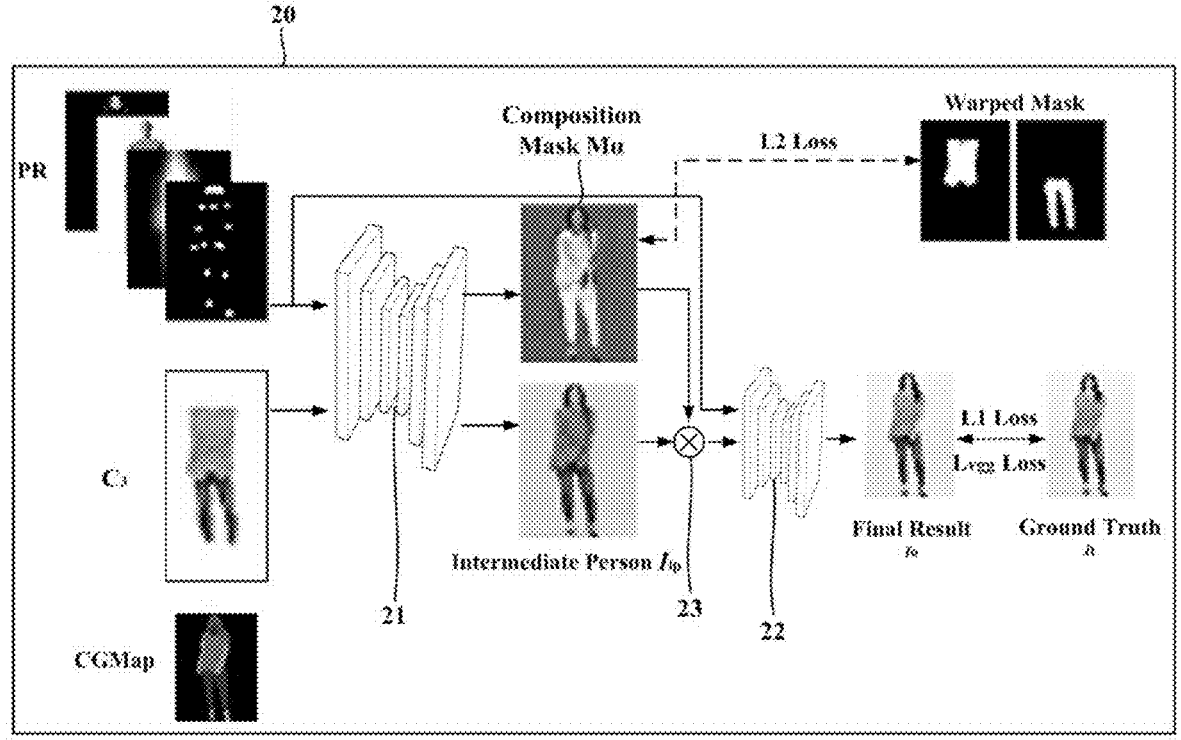
FIG. 13 is a diagram for illustrating a process in which a virtual fitting module virtually fits a plurality of clothes on a model object according to an embodiment of the present disclosure.
Figure 14:
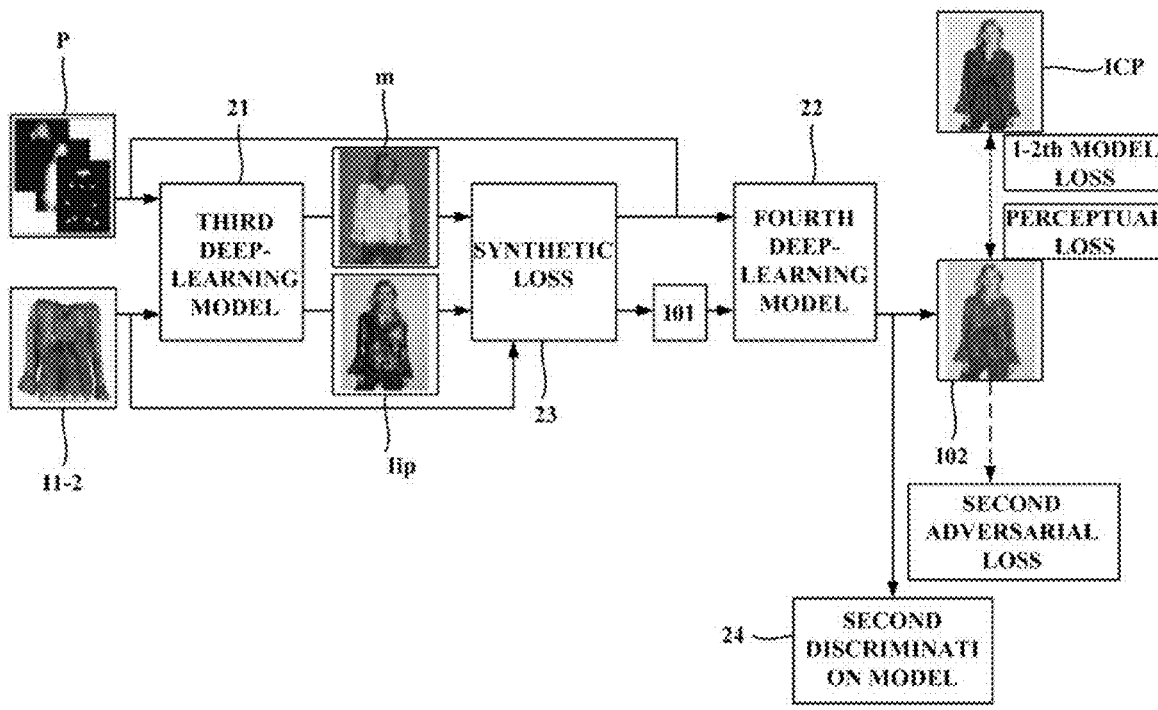
FIG. 14 is a diagram for illustrating a detailed structure of a virtual fitting module that virtually fits the plurality of clothes to a model object according to a embodiment of the present disclosure.
Figure 15:
FIG. 15 is examples illustrating a model to which a plurality of clothes are virtually fitted through a virtual try-on service application according to an embodiment of the present disclosure.

FIG. 13 illustrates a process in which the virtual fitting module 20 virtually fits a plurality of clothes on a model object according to an embodiment of the present disclosure, FIG. 14 illustrates a detailed structure of the virtual fitting module 20 that virtually fits the plurality of clothes to the model object according to the embodiment of the present disclosure, and FIG. 15 is examples illustrating a model to which a plurality of clothes are virtually fitted through a virtual try-on service application according to an embodiment of the present disclosure.

Referring to FIGS. 13 and 14, the virtual fitting module 20 may generate and output the virtual fitting image by aligning the transformed clothes object transformed to match the body of the user to match the model image PR and virtually fitting the transformed clothes object (S105, S106).

In detail, the virtual fitting module 20 may naturally synthesize a plurality of clothes objects into a model object to be virtually fitted based on the transformed clothes object, the model image PR, and the clothing guide map (CGMap).

In particular, the virtual fitting module 20 may use a synthetic mask image to guide where to place the transformed clothes object on the body of the model object, and an intermediate model image that naturally generates arms or hands of the model object according to the length of the transformed clothes object to enable the transformed clothes object to be fitted to match the body of the model object.

In addition, the virtual fitting module 20 may improve image quality and unnaturalness through the fourth deep-learning model 22 which is a refinement layer.

Referring to FIG. 14, the virtual fitting module 20 according to the embodiment of the present disclosure includes a third deep-learning model 21, a synthesis module 23, a fourth deep-learning model 22, and a second discriminator 24.

Generating Synthetic Mask and Intermediate Person of Third Deep-Learning Model 21

Referring to FIG. 13, the third deep-learning model 21 may generate a composite mask image $M\alpha$ and an intermediate model image $I_{ip}$ based on the model image PR and the transformed clothes object image $I_{1-2}$.

In the composite mask image $M\alpha$, the location where the transformed clothes object is disposed in the model image PR may be localized. The intermediate model image $I_{ip}$ may be an image in which arms, legs, feet, and/or hands, which are the body of the model object, are generated according to the length of the transformed clothes object.

As an example, when the length of the virtual action clothes is shorter than the length of clothes fitted by the model object in the model image PR, if the transformed clothes object is aligned to the model object and fitted, there is a possibility that the part where the body of the model object should be exposed is seen as clothes fitted before the transformed clothes object.

In this case, the third deep-learning model 21 may generate an intermediate model image $I_{ip}$ that generates arms and/or hands to be exposed when the transformed clothes object is fitted on the model object.

As an example, the third deep-learning model 21 may include two convolutional layers of two strides, four dilated convolution layers having different dilation rates, and two upsampling layers. In addition, a spectral normalization layer may be applied to the third deep-learning model 21 to improve GAN performance.

Synthesis of Transformed Clothes Object of Synthesis Module 23

The synthesis module 23 synthesizes the synthesized mask image M, the intermediate model image $I_{ip}$, and the transformed clothes object image $I_{1-2}$ to generate a first virtual fitting model image $I_{o1}$ in which the transformed clothes object image $I_{1-2}$ is virtually fitted by the model object. The synthesis module 23 may be synthesized according to Equation 7.

$$I_{o1} = M \otimes I_{1-2} + (1-M) \otimes I_{ip} \quad \text{(Equation 7)}$$

In Equation 7, $\otimes$ is matrix multiplication for each element.

Improvement in Image Quality of Fourth Deep-Learning Model 22

The fourth deep-learning model 22 may improve the image quality of the first virtual wearing model image $I_{o1}$ based on the model image P and the first virtual wearing model image $I_{o1}$, remove an artificial element of virtual fitting, and create a second virtual wear model image $I_{o2}$ with natural virtual fitting. That is, the fourth deep-learning model 22 may further improve the quality of the first virtual fitting model image $I_{o1}$ generated by the third deep-learning model 21 and the synthesis module 23. In addition, the fourth deep-learning model 22 may use the initially input model image P to preserve the original features of the model object.

As an example, the fourth deep-learning model 22 may use a plurality of dilated convolutions to maintain high-resolution features while preserving details of the input image. In addition, a spectral normalization layer may be applied to the fourth deep-learning model 22 to improve the GAN performance.

Training of Virtual Fitting Module 20

The virtual fitting module 20 may use the second model loss $L_{align}$ during training. The second model loss $L_{align}$ is a loss that causes the fitting of the transformed clothes object on the body of the model object to approximate the correct answer by comparing the second virtual fitting model image $I_{o2}$ output by the fourth deep-learning model 22 with a correct answer label $I_t$ of the training data set. The second model loss $L_{align}$ is expressed by Equation 8.

$$L_{align} = \|I_{o2} - I_t\|_1 \quad \text{(Equation 8)}$$

In addition, the virtual fitting module 20 may use a perceptual loss $L_{vgg}$ during training. The perceptual loss $L_{vgg}$ may use a VGG-19 neural network pre-trained so that the second virtual fitting model image $I_{o2}$ is optimized in a feature space, thereby further improving the image quality of the second virtual wearing model image $I_{o2}$. The perceptual loss $L_{vgg}$ may be calculated using Equation 9.

$$L_{vgg}(I_{o2}, I_t) = \sum_{i=1}^{5} \lambda_i \|\Phi_i(I_{o2}) - \Phi_i(I_t)\| \quad \text{(Equation 9)}$$

In Equation 9, $\Phi_i(I_{o2})$ is an i-th layer feature map of a VGG-19 neural network for the second virtual wearing model image $I_{o2}$. $\Phi_i(I_t)$ is the i-th layer feature map of the VGG-19 neural network for the correct answer label $I_t$ of the training data set.

In addition, the virtual fitting module 20 may use a second adversarial loss $L_{adv}$ during training. In this case, the virtual fitting module 20 may use a spectral-normalization GAN (SNGAN) during training. The SNGAN may improve the quality of the generated second virtual wearing model image $I_{o2}$. The virtual fitting module 20 may be trained in an adversarial manner between the fourth deep-learning model 22 and the second discriminator 24. That is, the fourth deep-learning model 22 minimizes a generation expected value $V_G$ of Equation 11 while the virtual fitting module 20 allows the second discriminator 24 to maximize a discrimination expected value $V_D$ of Equation 10. In addition, the virtual fitting module 20 may apply the hinge loss to further stabilize when applying the SNGAN.

$$v_D = \mathbb{E}_{I_t \sim P_{data}}[\min(0, -1 + D(I_t))] + \mathbb{E}_{I_{o2} \sim P_{generated}}[\min(0, -1 - D(I_{o2}))] \quad \text{(Equation 10)}$$

$$v_G = -\mathbb{E}_{I \sim P_{generated}}[D(I_{o2})] \quad \text{(Equation 11)}$$

The second adversarial loss $L_{adv}$ is expressed by Equation 12.

$$L_{adv}(I_{o2}) = \text{ReLU}(-D(I_{o2})) \quad \text{(Equation 12)}$$

In addition, the virtual fitting module 20 may use the second deep-learning model loss $L_{TOM}$ that linearly combines the above-described loss to align and virtually fit the transformed clothes object, which is transformed to match the body of the model object, to match the body of the model object. The second deep-learning model loss $L_{TOM}$ is expressed by Equation 13.

$$L_{TOM} = \lambda_{adv} L_{adv} + \lambda_{align} L_{align} + \lambda_{vgg} L_{vgg} + \lambda_{mask} \|1 - M\|_2 \quad \text{(Equation 13)}$$

In Equation 13, $\lambda_{adv}$, $\lambda_{align}$, $\lambda_{vgg}$ and $\lambda_{mask}$ are hyperparameters.

The model object may adjust the relative importance of each loss by adjusting the hyperparameters. For example, $\lambda_{adv}$, $\lambda_{align}$, $\lambda_{vgg}$ and $\lambda_{mask}$ may be set to 0.01, 1.0, 1.0, and 1.0, respectively. Also, in Equation 13, the penalty term for the synthetic mask image M is added to preserve the pixels of the transformed clothes object as much as possible.

Effect of Trained Virtual Fitting Module 20

The virtual fitting module 20 may naturally fit the transformed clothes object on the model object and generate the high-quality image.

Referring to FIG. 15, the results of generating the transformed clothes object fitting image by the virtual fitting module 20 according to the embodiment of the present disclosure are compared. First, the transformed clothes object (GMM Aligned) transformed by the geometric matching module 10 to match the transformed clothes object (in-shop clothes) to the body of the model object (target person) is commonly used.

Comparing the first result of the virtual fitting of the transformed clothes object (GMM aligned) to the model object (target person) and the second result of the virtual fitting module 20 to perform the virtual fitting, it can be seen that the virtual fitting module 20 shows the high-quality image with vivid colors and less artificial elements than simply fitting the transformed clothes, and better preserves the unique characteristics of the pattern and prints of the transformed clothes object.

As a result of a preference test for the first and second results for 2100 subjects for 60 people, it can be seen that about 83.8% of them prefer the second result.

In this way, the virtual try-on service application 101 may generate the virtual fitting image that is an image in which a plurality of clothes are naturally fused to a model.

Hereinabove, according to some embodiments of the present disclosure, the method and system for a clothing virtual try-on service based on deep learning provides a shape of virtual fitting of a plurality of clothes image C on a model object using a deep-learning neural network to enable models to virtually fit clothes they want and easily and rationally figure out whether the clothes fit the users well during shopping online, thereby saving time or money spent shopping for clothes.

In addition, the method and system for clothing virtual try-on service based on deep learning according to certain embodiments of the present disclosure may construct a deep-learning neural network that outputs virtual fitting results even with limited training data by virtually fitting a plurality of clothes object to a model with an outdoor background having various patterns and/or colors, etc. without distortion even when using a deep-learning neural network trained based on a training data set based on the images of the model 12 photographed in the background of an interior having a simple pattern and/or color, etc.

In addition, various embodiments according to embodiments of the present disclosure described above may be implemented in a form of program commands that may be executed through various computer components and may be recorded in a computer-readable recording medium. The computer-readable recording medium may include a program command, a data file, a data structure, or the like, alone or a combination thereof. The program commands recorded in the computer-readable recording medium may be especially designed and constituted for the present disclosure or be known to those skilled in a field of computer software. Examples of the computer-readable recording medium may include a magnetic medium such as a hard disk, a floppy disk, or a magnetic tape, an optical recording medium such as a compact disk read only memory (CD-ROM) or a digital versatile disk (DVD), a magneto-optical medium such as a floptical disk, and a hardware device specially configured to store and execute program commands, such as a read only memory (ROM), a random access memory (RAM), a flash memory, or the like. Examples of the program commands include a high-level language code capable of being executed by a computer using an interpreter, or the like, as well as a machine language code made by a compiler. A hardware device may be changed into one or more software modules to perform processing according to the present disclosure, and vice versa.

The specific implementations described in the present disclosure are examples, and do not limit the scope of the present disclosure in any way. For brevity of the specification, descriptions of conventional electronic components, control systems, software, and other functional aspects of the systems may be omitted. In addition, the connection or connection members of lines between the components shown in the drawings illustratively represent functional connections and/or physical or circuit connections, and in an actual device, may be represented as various functional connections, physical connections, or circuit connections that are replaceable or additional. In addition, it may not be a necessary component for the application of the present disclosure if there is no specific mention such as "essential", "importantly", etc.

In addition, in the detailed description of the present disclosure described, the present disclosure has been described with reference to a preferred embodiment of the present disclosure, but it can be understood that these skilled in the art or those with ordinary knowledge in the technical field can variously modify and change the present disclosure within the scope of the spirit and technical scope of the present disclosure described in the claims to be described later. Accordingly, the technical scope of the present disclosure should not be limited to the content described in the detailed description of the specification, but should be defined by the claims.

What is claimed is:

1. A method for a clothing virtual try-on service based on deep learning and performed by a virtual try-on service application executed by at least one processor of a computing device, the method comprising:
    determining a first clothes image including a first clothes object, a second clothes image including a second clothes object, and a model image including a model object;
    generating a first transformed clothes image by transforming a shape of the first clothes object included in the first clothes image to correspond to the model object included in the model image;
    generating a second transformed clothes image by transforming a shape of the second clothes object included in the second clothes image to correspond to the model object included in the model image; and
    generating and outputting a virtual fitting image obtained by synthesizing the first transformed clothes image and the second transformed clothes image to be virtually fitted on the model object,
    wherein the method further comprises segmenting the model object into a plurality of areas based on the model image, and generating a clothing guide map (CGMap) in which label information is determined for each of the segmented areas of the model object,
    wherein the segmenting of the model object into the plurality of areas based on the model image includes:
    segmenting a first fitting area for the first clothes object based on the model image and the first clothes object of the first clothes image;
    segmenting a second fitting area for the second clothes object based on the second clothes object of the second clothes image; and
    determining an overlapping area where a predetermined body area and the first and/or second fitting area of the model object are overlapped with each other and determining the determined overlapping area to be one of the predetermined body area and the first and/or second fitting area.

2. The method of claim 1, wherein the generating of the first transformed clothes image includes determining a segmentation area of the clothing guide map (CGMap) matching the first clothes object, and transforming the first clothes object by twisting and aligning the first clothes object to be geometrically matched with the determined segmentation area.

3. The method of claim 1, wherein the generating of the first transformed clothes image includes:
    determining a first geometric matching module that, when the first clothes object is a top garment, transforms the top garment; and
    generating a 1-1th transformed clothes object image by twisting and aligning, by the determined first geometric matching module, a direction of the first clothes object to be matched with a direction of an upper body area of the model object.

4. The method of claim 3, wherein the generating of the first transformed clothes image includes:
    determining, by the determined first geometric matching module, an overlapping area overlapped with the upper body area among body areas of the model object and an adjacent area adjacent to the upper body area; and
    generating the first transformed clothes image by transforming the 1-1th transformed clothes object image according to the overlapping area overlapped with the upper body area and the adjacent area adjacent to the upper body area.

5. The method of claim 4, wherein the generating of the second transformed clothes image includes:
    determining a second geometric matching module that, when the second clothes object is a bottom garment, transforms the bottom garment;
    generating a 2-1th transformed clothes object image by twisting and aligning, by the determined second geometric matching module, a direction of the second clothes object to be matched with a direction of a lower body area of the model object;
    determining, by the determined second geometric matching module, an overlapping area overlapped with the lower body area among the body areas of the model object and an adjacent area adjacent to the lower body area; and
    generating the second transformed clothes image by transforming the 2-1th transformed clothes object image according to the overlapping area overlapped with the lower body area and the adjacent area adjacent to the lower body area.

6. The method of claim 5, wherein the generating and outputting of the virtual fitting image obtained by synthesizing the first transformed clothes image and the second transformed clothes image to be virtually fitted on the model object includes:
    generating a transformed clothes object in which the first transformed clothes image and the second transformed clothes image are aligned to be matched with the model object; and
    generating the virtual fitting image in which the transformed clothes object is virtually fitted on the model object.

7. The method of claim 1, wherein the generating of the first transformed clothes image includes transforming an outline shape of the first clothes object to correspond to a outline shape of a first body area of the model object.

8. The method of claim 1, wherein the generating of the first transformed clothes image further includes correcting an inner shape of the transformed first clothes object according to an inner shape of the first clothes object before the inner shape of the transformed first clothes object is transformed.

9. The method of claim 1, wherein the generating and outputting of the virtual fitting image obtained by synthesizing the first transformed clothes image and the second transformed clothes image to be virtually fitted on the model object further includes generating an intermediate model image based on the first and/or second transformed clothes object and the model image.

10. The method of claim 9, wherein the generating of the intermediate model image based on the first and/or second transformed clothes object and the model image includes generating the intermediate model image by virtually generating a part of a body of the model object according to the first and/or second transformed clothes object corresponding to the model object of the model image.

11. The method of claim 10, wherein the generating of the intermediate model image by virtually generating the part of the body of the model object according to the first and/or second transformed clothes object corresponding to the model object of the model image includes virtually generating a first body corresponding to the first transformed clothes object of the first clothes image, and virtually generating a second body corresponding to the second transformed clothes object of the second clothes image.

12. The method of claim 11, wherein the generating and outputting of the virtual fitting image obtained by synthesizing the first transformed clothes image and the second transformed clothes image to be virtually fitted on the model object includes generating the virtual fitting image based on the intermediate model image, the first and/or second transformed clothes object, and a clothing guide map (CGMap).

13. A system for a clothing virtual try-on service based on deep learning, comprising:
at least one processor; and
at least one memory,
wherein at least one application stored in the memory and executed by the at least one processor to perform a process of the clothing virtual try-on service based on the deep learning is configured to:
determine a first clothes image including a first clothes object, a second clothes image including a second clothes object, and a model image including a model object,
generate the first transformed clothes image by transforming a shape of the first clothes object included in the first clothes image to correspond to the model object included in the model image,
generate the second transformed clothes image by transforming a shape of the second clothes object included in the second clothes image to correspond to the model object included in the model image,
generate a virtual fitting image obtained by synthesizing the first transformed clothes image and the second transformed clothes image to be virtually fitted on the model object includes, and
output the virtual fitting image,
wherein the at least one processor is further configured to segment the model object into a plurality of areas based on the model image, and generate a clothing guide map (CGMap) in which label information is determined for each of the segmented areas of the model object,
wherein the segmenting of the model object into the plurality of areas based on the model image includes:
segmenting a first fitting area for the first clothes object based on the model image and the first clothes object of the first clothes image;
segmenting a second fitting area for the second clothes object based on the second clothes object of the second clothes image; and
determining an overlapping area where a predetermined body area and the first and/or second fitting area of the model object are overlapped with each other and determining the determined overlapping area to be one of the predetermined body area and the first and/or second fitting area.

* * * * *